United States Patent [19]

Snelling

[11] 4,348,100
[45] Sep. 7, 1982

[54] CONTROL FOR XEROGRAPHIC SYSTEM
[75] Inventor: Christopher Snelling, Penfield, N.Y.
[73] Assignee: Xerox Corporation, Stamford, Conn.
[21] Appl. No.: 183,133
[22] Filed: Sep. 2, 1980
[51] Int. Cl.³ ............................................. G03G 15/00
[52] U.S. Cl. ................................ 355/14 R; 355/14 D
[58] Field of Search ............. 355/14 E, 14 D, 14 CH, 355/14 R, 3 R, 3 DD; 346/153.1; 358/300

[56] References Cited

U.S. PATENT DOCUMENTS

| | | | |
|---|---|---|---|
| 3,659,556 | 5/1972 | Mutschler | 118/637 |
| 4,026,643 | 5/1977 | Bergman | 355/3 DD |
| 4,046,471 | 9/1977 | Branham et al. | 355/3 R X |
| 4,082,445 | 4/1978 | Steiner | 355/3 DD |
| 4,215,930 | 8/1980 | Miyakawa et al. | 355/14 E |
| 4,272,182 | 6/1981 | Abe et al. | 355/14 D |

FOREIGN PATENT DOCUMENTS 1559341 1/1980 United Kingdom ............. 355/14 E

Primary Examiner—Richard L. Moses
Attorney, Agent, or Firm—Frederick E. McMullen

[57] ABSTRACT

A combination xerographic/flying spot scanning apparatus wherein xerographic images produced by the xerographic section are scanned following development by the scanning beam of the scanning section to produce image signals or pixels representative of the image scanned. To accommodate changes in the apparatus due to use and wear on the components, a test image is produced in the interdocument area, and following development, scanned by the scanning beam. The signals produced from the test image are utilized to update the threshold level at which image signals produced by the apparatus scanning section are processed.

6 Claims, 5 Drawing Figures

CONTROL FOR XEROGRAPHIC SYSTEM

The invention relates to processing image signals produced by reading xerographic images in process, and more particularly, to adjusting threshold levels while processing image signals in response to current operating conditions of the xerographic processor.

In systems wherein image signals representative of a document original are produced by raster scanning embryonic xerographic images at some point during the copy producing cycle of a xerographic apparatus, as for example where latent electrostatic images following development are scanned by a flying spot beam, reliance is by necessity placed on the xerographic apparatus to provide uniformly accurate images of the original in the first instance. However, the image quality and faithfulness of the xerographic images may change over a span of time as the xerographic apparatus and the various operating components thereof wear or age. If the parameters by which the image signals, produced by scanning xerographic images, are processed are not sufficiently flexible, then there may result image signals that do not optimumly represent the original. This becomes evident when the image signals are later used as a source of copies and comparisons of the copies with the original made. While image signal processing parameters with leeway to accommodate changes in the quality and condition of the image scanned have been contemplated, the relatively strict requirements imposed by the desire to achieve optimum processing has greatly restricted, if not altogether eliminated, any ability of most systems to adjust to changes in the xerographic image due to changes or deterioration of the xerographic apparatus.

This invention relates to a control for one or more of the components in an apparatus having xerographic and scanning subsystems comprising, in combination: a xerographic system with a movable photoreceptor, means to charge the photoreceptor in preparation for imaging, exposure means for exposing the charged photoreceptor to produce latent electrostatic images on the photoreceptor, developing means for developing latent electrostatic images, and transfer means for transferring developed images from the photoreceptor to a copy substrate material; a scanning subsystem with a high intensity beam of electro-magnetic radiation, means to focus the beam onto the photoreceptor upstream of the developing means, means to produce at least one test image on the photoreceptor representative of current operating conditions of the xerographic system for developing by the developing means, means to scan the beam across the photoreceptor and the test image, image reading means for converting scattered radiation from scanning the test image on the photoreceptor with the beam to a signal representative of the test image, and signal processing means for processing the image signals to provide signals representative of the developed image scanned; means to compare the signal with a reference signal representing desired operation of the one component to provide a control signal; and control means for regulating operation of the one component in response to the control signal and maintain the one component attuned to current operating conditions of the xerographic subsystem.

Other objects and advantages will be apparent from the ensuing description and drawings in which.

Figure 1:
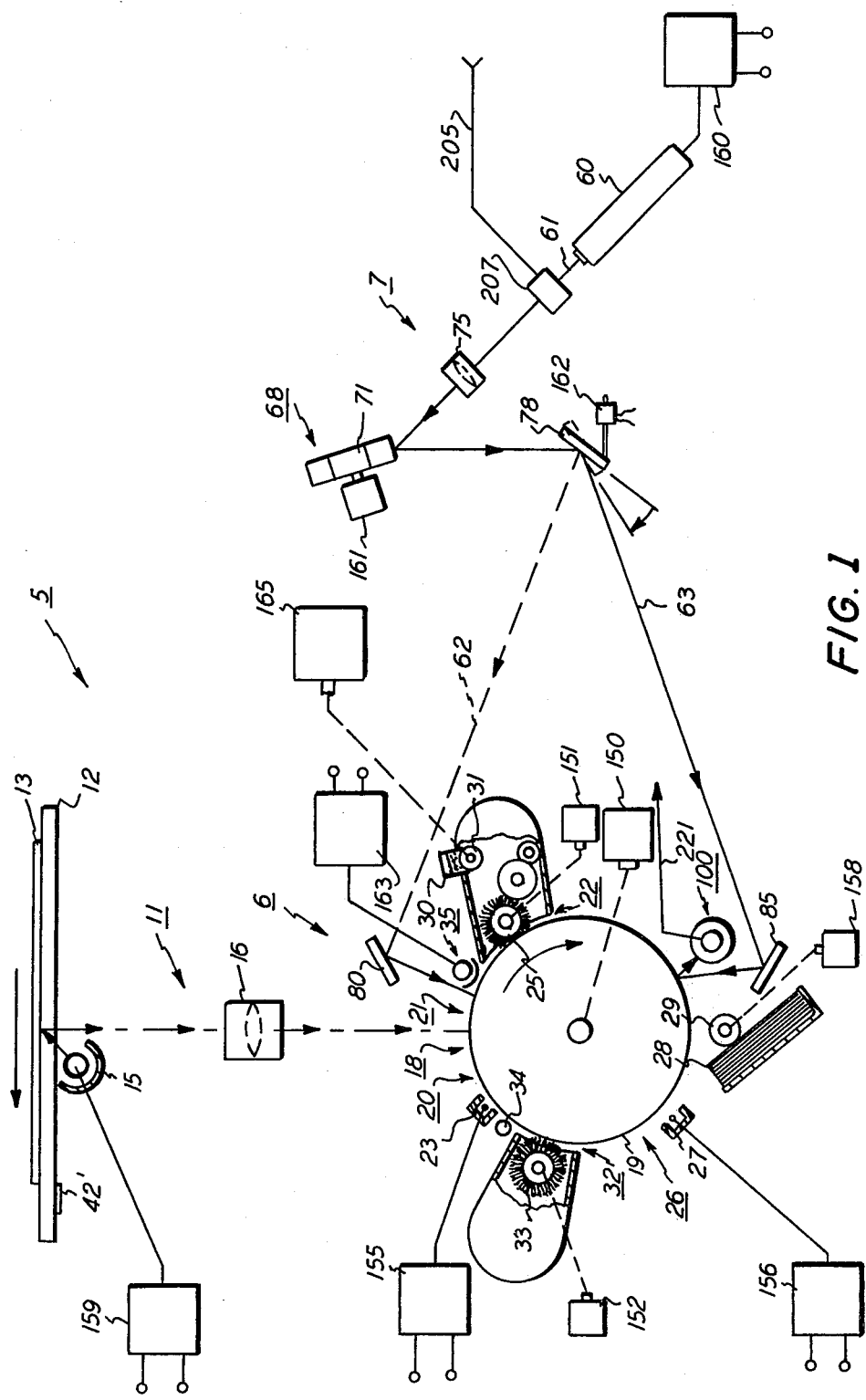
FIG. 1 is a schematic view showing an exemplary apparatus for controlling system processing components in accordance with the teachings of the present invention.
Figure 2:
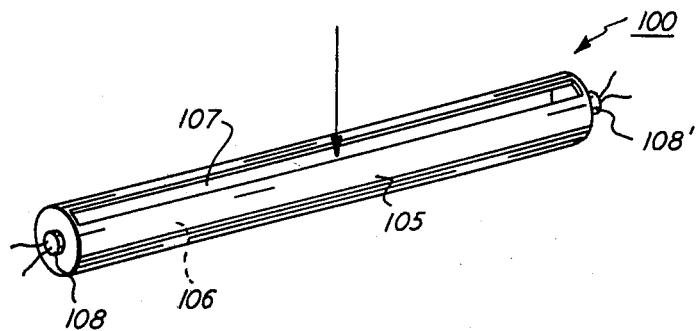
FIG. 2 is an isometric view showing details of the integrating cavity used in the apparatus shown in FIG. 1.

Referring now particularly to FIGS. 1 and 2 of the drawings, there is shown an exemplary reproduction apparatus 5 incorporating the present invention. Reproduction apparatus 5 includes a xerographic section 6 having a viewing station or platen 12 where document originals 13 to be reproduced or copied are placed. For operation in the COPY mode, as will appear more fully herein, a light/lens imaging system 11 is provided, the light/lens system including a light source 15 for illuminating the original 13 at platen 12 and a lens 16 for transmitting image rays reflected from the original 13 to the photoconductive surface 19 of drum 18 at exposure station 21.

Charging, developing, transfer, and cleaning stations 20, 22, 26, 32 respectively are disposed about drum 18 in operative relation thereto. Charging station 20 includes a corona charging means 23 for depositing a uniform electrostatic charge on the photoconductive surface 19 of drum 18 in preparation for imaging. A suitable developing mechanism, which may for example, comprise a magnetic brush roll 25, is provided at developing station 22 for developing the latent electrostatic images created on drum 18. Magnetic brush roll 25 is driven by drive motor 151. To maintain an adequate supply of developing material and replenish toner used up, a toner supply 30 with toner dispensing roll 31 is provided. Dispensing roll 31 is driven by motor 165.

At transfer station 26, corona transfer means 27 effects transfer of the developed image to a suitable copy substrate material 28. Copy substrate material 28 is brought into transfer relationship with the developed image on drum 18 at transfer station 26 by feed roll means 29 driven by motor 158. A suitable drum cleaning device such as a rotating cleaning brush 33 is provided at cleaning station 32 for removing leftover developing materials from the surface 19 of drum 18. Brush 33, which is disposed in an evacuated housing through which leftover developr materials removed from the drum surface by the cleaning brush are exhausted, is driven by motor 152. Erase lamp 34 downstream of brush 33, serves to remove leftover charges on the photoconductive member preparatory to charging.

In the example shown, photoconductive surface 19 comprises a uniform layer of photoconductive material such as amorphous selenium on the surface 19 of drum 18. Drum 18 is supported for rotation by suitable bearing means (not shown). A drive motor 150 is drivingly coupled to drum 18 and rotates drum 18 in the direction shown by the solid line arrow when processing copies.

A suitable source of power, exemplified herein by power supplies 155, 156, 159, is provided for energizing corona charging means 23, transfer means 27, and light source 15 respectively.

When operating in the COPY mode, the photoconductive surface 19 of drum 18 is charged to a uniform level by corona charging means 23. Platen 12 (and any original document 13 thereon) is irradiated by light source 15, the light reflected from document 13 being focused onto the photoconductive surface 19 of drum 18 by lens 16 at exposure station 21. Platen 12 and the document 13 thereon are at the same time moved in synchronism with rotation of the drum 18. The light reflected from the original 13 selectively discharges the charged photoconductive surface in a pattern corresponding to the image that comprises the original document.

The latent electrostatic image created on the surface 19 of drum 18 is developed by magnetic brush 25 and transferred to copy substrate material 28, brought forward in timed relation by feed roll means 29 through the action of transfer corona means 27. Following transfer, the photoconductive surface 19 of drum 18 is cleaned by cleaning brush 33 to remove leftover developer material. A suitable fuser or fixing device (not shown) fixes the image transferred to copy substrate material 28 to render the copy permanent.

While a drum type photoconductor is illustrated other photoconductor types such as belt, web, etc. may be envisioned. Photoconductive materials other than selenium, as for example, organic may also be contemplated. And while a scan type imaging system is illustrated, other types of imaging systems such as full frame flash, may be contemplated.

The photoconductor may be opaque, that is, impervious to light, or wholly or partially transparent. The exemplary drum 18 typically has an aluminum substrate which renders the drum opaque. However, other substrate materials such as glass may be contemplated, which would render drum 18 wholly or partially transparent. One organic photoconductive material consists of an aluminized mylar substrate having a layer of selenium dispersed in poly-N-vinyl carbazole with a transparent polymer overcoating containing a charge transport compound such as pyrene.

Xerographic reproduction apparatus 5 includes a scanner section 7 having a suitable flux source of electro-magnetic radiation such as laser 60. A suitable power source 160 is provided for operating laser 60. The collimated beam 61 of monochromatic radiation generated by laser 60 passes to a modulator 207, which for operation in the WRITE mode, modifies the beam 61 in conformance with information contained in image signals input thereto, through line 205. Modulator 207 may comprise any suitable modulator, such as acousto-optic or electro-optic type modulator for imparting the informational content of the image signals input thereto to beam 61.

From modulator 207, beam 61 passes through lens 75 to a rotating scanning polygon 68. Lens 75 serves to focus the beam to a selected spot in the focal plane proximate the surface 19 of drum 18. Polygon 68 has a plurality of flat mirror surfaces or facets 71 against which the beam 61 impinges. Polygon 68 is driven by motor 161. The scanning beam reflected by polygon 68 scans across the surface 19 of drum 18 along an axis parallel to the axis of rotation of drum 18.

The scanning beam from polygon 68 is reflected by read/write control mirror 78 selectively to either a point on drum 18 upstream of developer station 22 (i.e. image WRITE beam 62) or to a point on drum 18 downstream of developer station 22 (i.e. image READ beam 63). Mirrors 80, 85 reflect beams 62, 63 to surface 19 of drum 18 from control mirror 78. Read/write control mirror 78 is supported for limited movement between a READ position (shown in solid line in the drawing) and a WRITE position (shown in dotted line in the drawing). A suitable driving mechanism such as solenoid 162 is provided to selectively move the mirror 78 from one position to the other. Return spring means (not shown) may be provided to return mirror 78 to the original position upon deenergization of solenoid 162.

In the READ mode, where the photoconductive material is opaque, light impinging on the surface 19 of drum 18 is scattered. In the case where the photoconductive material is transparent, the light is transmitted, depending on the degree of transparency of the photoconductive material, through the photoconductive material to the drum interior. As will be understood, scattered light is composed of both specular and diffuse reflected light while transmitted light is composed of specular and diffuse transmitted light. The reflected or transmitted light from the photoconductive surface 19 of drum 18 and the developed image thereon is collected by a collection optics system 100, and there converted to image signals when operating in the READ mode, as will appear.

Referring particularly to FIG. 2, an exemplary collection optics system 100 consists of elongated hollow cylindrical housing 105 disposed adjacent and in predetermined spaced relationship to the surface 19 of drum 18, housing 105 being supported such that the longitudinal axis of housing 105 substantially parallels the axis of drum 18. Housing 105 is provided with an elongated slit-like aperture 107 in the wall thereof opposite the photoconductive surface 19 of drum 18, housing 105 being located such that light scattered from the drum surface and the developed image thereon passes through aperture 107 into the interior 106 of housing 105. A pair of photodetectors 108, 108' are provided in housing 105 at the ends thereof, photodetectors 108, 108' generating signals in response to the presence or absence of light. To enhance the light responsiveness of housing 105, the interior wall thereof is preferably finished with a highly reflective material such as a highly reflective lambertian coating.

It will be understood that where the photoconductive material is transparent, the collection optics system 100 is suitably supported within the interior of drum 18 to receive light transmitted through the photoconductive material.

Figure 3:
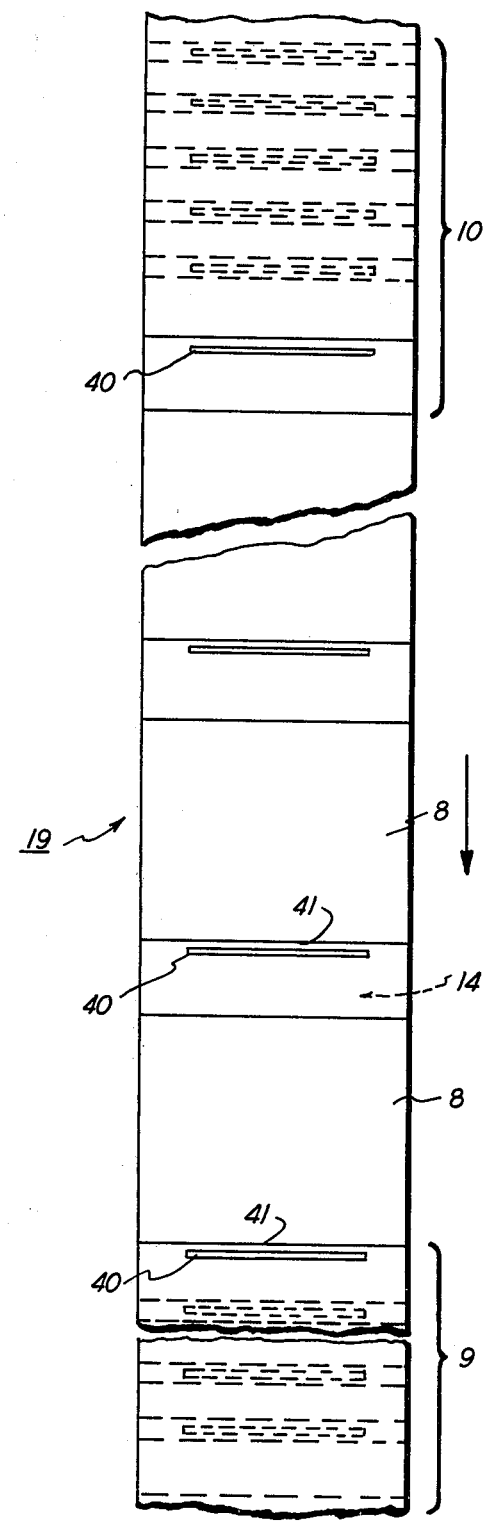
FIG. 3 is a view in which the photoconductive drum surface is laid out flat for the purpose of illustrating erasure of charged but unused areas of the photoconductive surface including creation of test images.

Referring particularly to FIGS. 1-3 of the drawings, in the COPY mode, latent electrostatic images 8 are formed on the photoconductive surface 19 of drum 18 through exposure of the document 13 on platen 12 as described heretofore. In the WRITE mode, the latent electrostatic images 8 are created on the charged photoconductive surface 19 of drum 18 by image WRITE beam 62 as the beam scans across the surface 19. In this mode, solenoid 162 is energized to move control mirror 78 to the write position (the dotted line position shown in FIG. 1). In this position, mirrors 78, 80 cooperate to produce image WRITE beam 62 at a point on the surface 19 of drum 18 upstream of developing station 22. Modulator 207 modulates the light intensity of the beam in accordance with the content of the image signals input thereto through line 205 to dissipate the electrostatic charge on the drum surface and create (i.e. write)

latent electrostatic images 8 representative of the image signals input thereto. The electrostatic latent images created on the surface of drum 18 are thereafter developed by magnetic brush roll 25 and transferred to copy substrate material 28 by corona transfer means 27 at transfer station 26. Following transfer, the surface of drum 18 is cleaned by cleaning brush 33 as described.

In the image WRITE mode, and in the image READ mode described below, polygon 68 is continually driven at substantially constant velocity by motor 161. In the WRITE mode, the image signal source (210 in FIG. 4) is synchronized with rotation of polygon 68. The rotational rate of xerographic drum 18, which determines the spacing of the scan lines is preferably synchronized to the signal source in order to maintain image linearity.

For operation in the image READ mode, solenoid 162 is deenergized to place control mirror 78 in the read position (the solid line position shown in FIG. 1). In this position, image READ beam 63 scans developed images on drum 18 line by line. The light from beam 63' which is reflected from the photoconductive surface 19, is collected by integrating housing 105 in accordance with the presence or absence of toner on the drum surface, it being understood that where the light beam strikes toner, the light is absorbed, whereas where the light beam strikes uncovered portions of the photoconductive surface 19 of drum 18, a fraction of the light is scattered and reflected back by the photoconductive surface to integrating housing 105. The presence or absence of light in housing 105 is sensed by photosensors 108, 108' to provide an analog image signal representative of the developed image scanned in lead 221. The image signals generated by photodetectors 108, 108' during the image READ mode are thereafter processed as may be appropriate, such processing normally including thresholding or screening to convert the analog image signals produced to digital (i.e. binary "1" or "0") signals for further use, storage, transmission, etc.

Following reading, developed images on drum 18 may be transferred to substrate material 28 in the manner described heretofore. Alternately, transfer may be dispensed with and the drum surface cleaned by cleaning brush 33. For operation in this mode, developed images are ordinarily derived from document originals on platen 12 through operation in the copy mode as described earlier.

As may be seen in FIG. 3 the first and last latent electrostatic images 8 in a succession of images formed on the surface 19 of drum 18 are normally preceded by and followed by a startup and shutdown stage or area 9, 10 respectively, where, although the photoconductive surface 19 is charged, no images are produced. Additionally, in the case of multiple images, a space, identified herein as the interdocument space 14, normally occurs between the leading and trailing edges of the images 8 in which no image is formed. To prevent or inhibit development of the startup, shutdown, and any interdocument areas 9, 10, 14 and thereby reduce the load on cleaning brush 33, a discharge device, in the form of an erase lamp 35 is provided astride the path of the photoconductive surface 19 to discharge or dissipate the charges on drum 18 in these areas.

Figure 4:
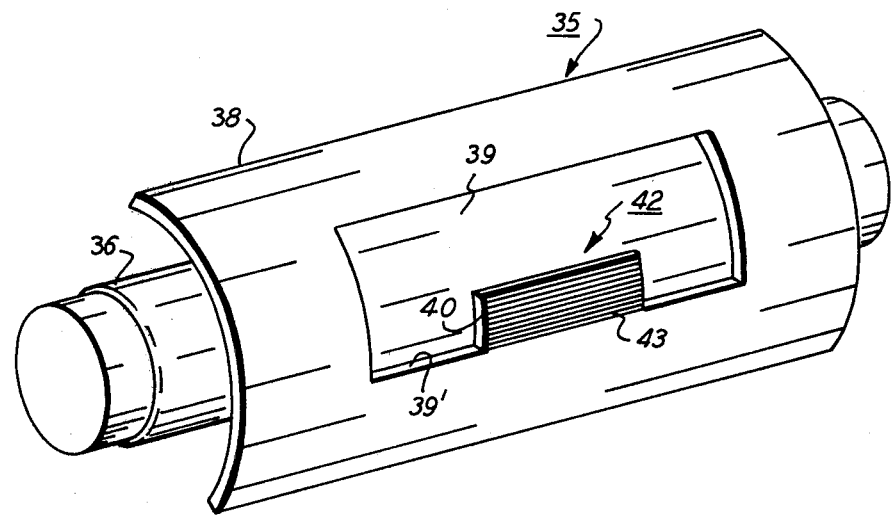
FIG. 4 is an enlarged isometric view showing details of the interdocument erase lamp incorporating means to create test images.

Referring to FIGS. 1 and 4, erase lamp 35 comprises an elongated cylindrical flash lamp 36, having an arcuate shield 38 spacedly disposed around the portion of the lamp 36 facing the photoconductive surface. Lamp shield 38 has an elongated aperture 39 therein through which light from lamp 36 is directed onto a predetermined area, corresponding to the interdocument area 14, of the photoconductive surface 19 of drum 18. A suitable flash lamp power supply 163 (FIG. 5) is provided for energizing erase lamp 36. As will be understood by those skilled in the xerographic arts, erase lamp 35 is suitably supported so that the axis of lamp 35 is substantially parallel to the axis of drum 18 with the erase lamp disposed along the path of the photoconductive surface between charging station 20 and developing station 22.

A test image 40 in the form of a transparency 42 is disposed in aperture 39 of erase lamp shield 38.

To provide a delay interval 41 between copy image 8 and the test image 40 for moving control mirror 78 from the image reading position (the solid line position of FIG. 1) to the image writing position (the dotted line position of FIG. 1), transparency 42 includes a clear (i.e. no-image) band 43 adjacent the edge 39' of aperture 39.

In operation, each actuation of flash lamp 36 exposes transparency 42 to project a test image onto the photoconductive surface 19 of drum 18 in spaced relation to copy image(s) 8. Exposure of the charged photoconductive surface 19 by erase lamp 35 dissipates the charge on photoconductive surface (except for the test image area of transparency 42) to prevent subsequent development thereof by magnetic brush roll 25. Exposure of transparency 42 creates a latent electrostatic test image 40 on the charged photoconductive surface 19 which is thereafter developed at developing station 22 for reading by image reading beam 63, as will appear.

Figure 5:
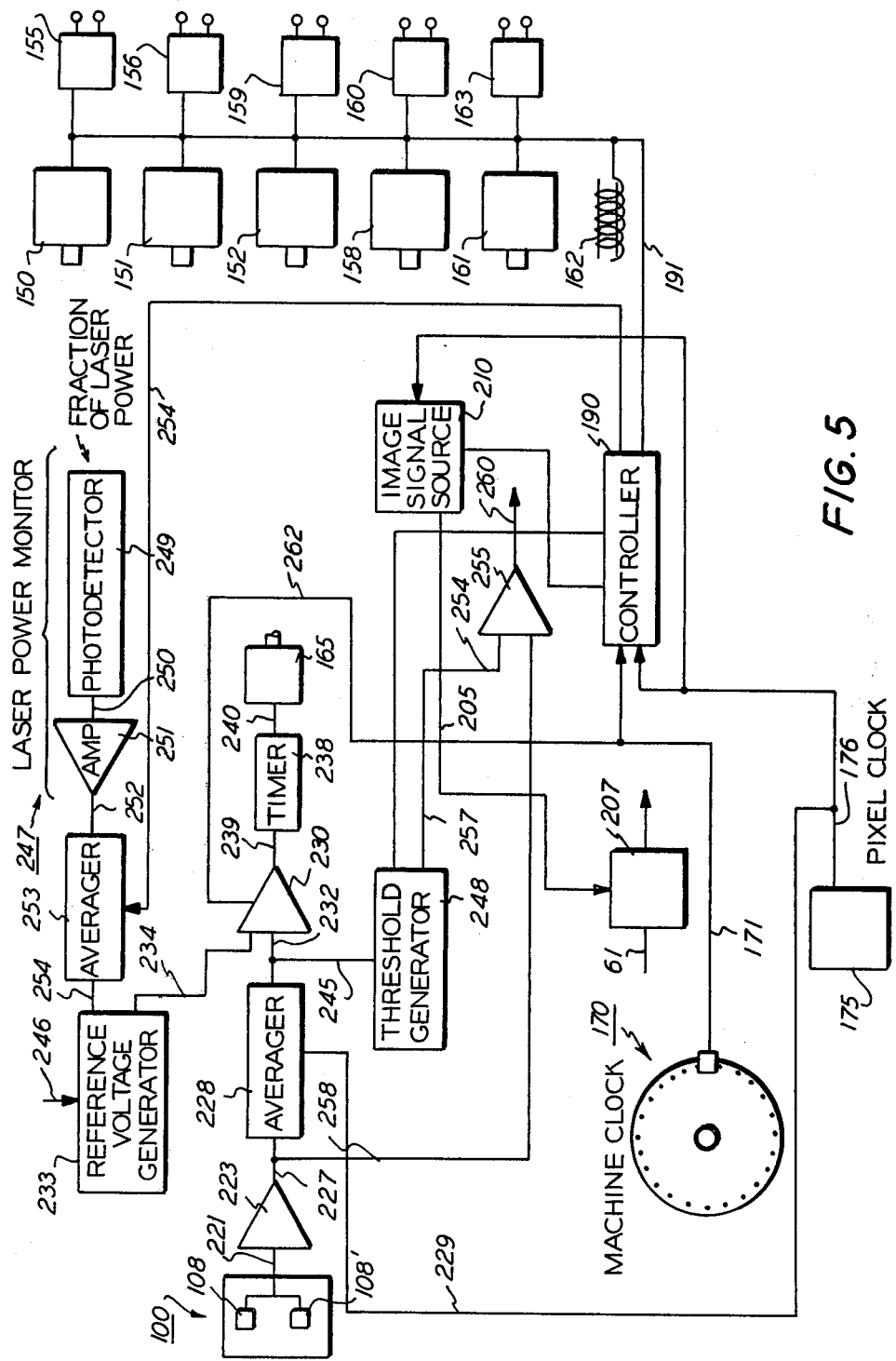
FIG. 5 is a schematic view of the system for controlling the apparatus of the present invention.

Referring to FIGS. 1 and 5, a suitable controller 190 is provided for controlling operation of the various components comprising the apparatus 5. Controller 190 is coupled to the several operating components of apparatus 5, namely, drum drive motor 150, developer drive motor 151, cleaning brush drive motor 152, power supplies 155, 156 for charge and transfer devices 23, 27, feed roll drive motor 158, exposure and erase lamp power supplies 159, 163 laser power supply 160, polygon drive motor 161, and read/write control mirror solenoid 162 through bus 191. A suitable machine clock generator 170 is provided to generate clock signals in response to movement of drum 18. Machine clock signals from clock 170 are input to controller 190 through lead 171. An image pixel clock 175 serves to generate clock signals for clocking image signals to scanner section 7. Lead 176 feeds clock signals from pixel clock 175 to controller 190.

As will be understood, controller 190 serves during the aforedescribed copy, write and read cycles to actuate various operating components of apparatus 5 in a predetermined timed sequence. In the COPY mode, drum motor 150 is energized to rotate drum 18. Concurrently therewith, developer roll and cleaning brush drive motors 151, 152 are energized. Charge corotron 23 is energized to provide a uniform electrostatic charge on the photoconductive surface 19 of drum 18 preparatory to imaging, and exposure lamp 15 energized to illuminate the platen and document original 13 thereon to create an electrostatic image 8 on the previously charged surface 19 of drum 18. As the developed latent electrostatic image nears transfer station 26, sheet feed roll drive motor 158 is energized to feed a sheet of copy substrate material 28 forward for transfer of the developed image thereto.

In the image WRITE mode, laser 60 and polygon drive motor 161 are energized and solenoid 162 triggered to scan the photoconductive surface with image writing beam 62. Exposure lamp 16, utilized in the COPY mode is de-energized during this operational mode. In the image READ mode, the xerographic components are energized as described above, together with laser 60 and polygon drive motor 161 to read developed images on drum 18. In this mode of operation, solenoid 162 is deenergized and control mirror 28 is in the solid line position shown.

In the image READ mode, the image to be read is ordinarily derived from a document original on platen 12, and for this purpose exposure lamp 15 is energized in proper timed sequence to create latent electrostatic image(s) on drum 18 for development at developing station 22 prior to reading thereof by image reading beam 63. Following reading, the developed image(s) may be transferred to copy substrate material 28 as in the COPY mode, or the developed image removed at cleaning station 32. In the alternative, the developed image(s) may be created electronically by image writing beam 62 as in the image WRITE mode although generation of the developed image(s) in this manner would not ordinarily be anticipated inasmuch as the image source already comprises image signals or pixels.

As will be understood by those skilled in the xerographic arts, the various operating components of xerographic section 6 often change during use and over the lifetime of the apparatus, resulting in changes in the content of the images formed and developed on the photoconductive surface 19 of drum 18. To accommodate changes or deterioration of the xerographic components, a control is provided herein to monitor xerographic processing conditions, and to vary or adjust the threshold parameter at which image signals produced during the image READ mode are processed and/or to adjust one or more of the xerographic processing components, as will appear.

Referring to FIG. 5, a suitable source of copy images 8 for operation in the WRITE mode, designated herein by the numeral 210 is provided. Image source 210 may comprise for example a memory, raster input scanner, facsimile, communication channel, keyboard, etc. Image source 210 is coupled to modulator 207 through lead 205.

Detectors 108, 108' of the collection optics system 100 are coupled through lead 221 to a suitable signal amplifier 223 which serves to amplify the test signals output of detectors 108, 108'. The output of amplifier 223 is coupled by lead 227 to a suitable signal averaging circuit 228 which functions to average the signal inputs thereto over a predetermined timed interval. Timing signals in the form of pixel clock pulses are input to averaging circuit 228 from pixel clock 175 via lead 229.

The average signal output of averaging circuit 228 is fed to comparator 230 and threshold generator 248 through leads 232, 245 respectively. Comparator 230 compares the average signal output by circuit 228 with a preset reference signal provided by reference voltage generator 233 through lead 234. Reference voltage generator 233 has a control lead 246 to enable the reference settings to be varied manually.

The output of comparator 230 controls operation of timer 238, lead 239 coupling comparator 230 with the timer input. Timer 238, which may be preset to output an energizing signal to drive motor 165 of toner dispensing roll 31 for a predetermined interval, is coupled to motor 165 by lead 240.

During the aforedescribed operation of the apparatus 5 in the COPY, WRITE, and READ modes, motor 165 may be actuated by timer 238 at various times for a predetermined interval to replenish the supply of toner in developing station 22 as will appear herein.

To enable changes in images developing ascribable to changes in developer content to be differentiated from changes due to changes in the intensity of the light beam generated by laser 60, a laser power monitor 247 is provided. Monitor 247 includes a photodetector 249 for measuring the intensity of the light beam 61 generated by laser 60. The beam intensity signal output by photodetector 249 is fed via lead 250 to a suitable signal amplifier 251 where the signal is amplified. The beam intensity signal from amplifier 251 is input through lead 252 to a suitable signal averaging circuit 253 which serves on a controller input through lead 254, to average the signal output of photodetector 249. The signal from averaging circuit 253 is fed through lead 256 to a control input of voltage generator 233, the beam intensity level signal serving to modify or adjust the reference voltage output by generator 233 in accordance with the intensity level of the scanning beam 61 generated by laser 60.

Test signals derived by the collection optics system 100, following amplification by amplifier 223 and averaging by averaging circuit 228, are additionally input through lead 245 to threshold generator 248. Generator 248 comprises any suitable signal generating circuit adapted to output a threshold signal at a voltage level corresponding to the level of the signal input thereto. The threshold signal output of generator 248 is applied through lead 256 to one input of image signal thresholding circuit 255. The other input to thresholding circuit 255, comprises image signals obtained by reading the developed image on the photoconductive surface 19, line 227 being tapped by lead 258 for this purpose.

To correlate operation of comparator 230, with the machine function, comparator 230 is driven by means of clock pulses generated by machine clock 170, lead 262 coupling clock 170 to comparator 230.

During operation of reproduction apparatus 10, controller 190 periodically triggers erase lamp power supply 163 in timed synchronism with movement of drum 18 to actuate lamp 35 and discharge (i.e. erase) startup, shutdown, and interdocument area(s) 9, 10, 14 respectively. Inasmuch as the size of startup and shutdown areas 9, 10 is normally greater than the size of interdocument area 14, erase lamp 35 is normally repeatedly actuated by controller 35 when discharging these areas.

During operation in the COPY, WRITE, and READ modes, erase lamp 35 is periodically actuated by a signal from controller 190 to erase (i.e. discharge) the startup and shutdown areas 9, 10, as well as the interdocument area(s) 14 where multiple copy images are made. Actuation of erase lamp 35 simultaneously exposes transparency 42 to project a test image 40 onto the photoconductive surface 19 of drum 18. The latent electrostatic test image or pattern created on drum 18 is thereafter developed at developing station 22 by developing roll 25.

To prevent creation of test images in undesired areas of drum 18 or of multiple test images where successive actuations of erase lamp 35 are required to erase relatively large areas of drum 18, i.e. startup and shutdown areas, 9, 10, timing of erase lamp actuations by controller 190 is arranged so that erase lamp 35 effectively discharges all test images except one when discharging these areas.

During operation in the COPY mode, a test image 40 is created in the startup area 9, each interdocument area(s) 14 where multiple copies are made, and in the shutdown area 10, an developed. As the developed test images reach the point where image reading beam 63 impinges on the photoconductive surface 19 of drum 18, beam 63 is actuated to scan (i.e. read) the developed test image.

Scanning of the developed test image by beam 63 generates a block of test image signals in lead 221. The block of test image signals is amplified by amplifier 223, the amplified test signals being input through lead 227 to averaging circuit 223 where the test signals are averaged over a predetermined interval, normally the period required to scan the developed test image. The averaged test signals are compared by comparator 230 to a preset reference signal derived from reference voltage generator 233. Where the comparison indicates a need for additional toner, the signal output of comparator 230 triggers timer 238 which in turn, actuates toner dispensing roll drive motor 165 for a preset interval. Rotation of roll 31 dispenses additional toner from toner supply 30 into the developing station 22.

When in the READ mode, image signals derived from reading the developed image on the photoconductive surface 19 are input via lead 258 to image signal thresholding circuit 255 where the signals are compared, i.e. thresholded, against the threshold signal output by threshold generator 248 to provide processed image signals representative of the developed image scanned to output line 260.

As will be understood, adjustments in the developing level of developing station 22 through the addition or replenishment of toner does not normally result in an immediate change in developing level. However, in the image READ mode, adjustments in the level at which the image signals are thresholded accommodates any deficiency in the xerographic section developing pending changes in developing due to the addition of fresh toner. Similarly, any deterioration in developing as toner is used up and before new toner is added is accommodated by adjustment of the threshold level until such time as fresh toner is added.

Operation during the image WRITE mode requires sequential operation of both image write and read beams 62, 63, one to write latent electrostatic copy images 8 on the charged surface of drum 18 in accordance with image data input from image signal source 210, the other to read the developed test images 40 produced by erase lamp 35 in the unused area of drum 18 before, between, and after copy images 8. In this operational mode, signals from controller 190 actuate laser 60 and polygon motor 161 and initially, solenoid 162 to provide image writing beam 62. The image signal source is also enabled by controller 190 to input image signals representative of the copy image 8 to be produced to modulator 207. It is understood that a latent electrostatic test image is produced prior to generation of the copy image 8 by image writing beam 62 through exposure of the startup area 9 by erase lamp 35. Following creation of the copy image 8 by image writing beam 62, erase lamp 35 is again triggered by signal(s) from controller 190 to erase charges in the area following the copy image 8 and create another latent electrostatic test image.

As the developed test image approaches the point where reading beam 63 impinges on the photoconductive surface 19 of drum 18, a signal from controller 190 deenergizes solenoid 162 permitting control mirror 78 to return to the solid line position shown in FIG. 1 to produce image reading beam 63. As the test image 40 is read, test image signals derived therefrom are averaged by averaging circuit 228 prior to input to comparator 230 where the signals are compared with a preset reference voltage level in the manner described heretofore.

Following scanning of the test image, signals from controller 190 energize solenoid 162 to move control mirror 78 to the dotted line position in FIG. 1 to provide image writing beam 62. At the same time, the image signal source is enabled to transmit the next page of image data.

The system may be operated to periodically produce and scan test images as described heretofore. During the interval while test images are being processed, production of copies through the use of image writing beam 62 is prevented.

Alternately, the dimensional relationship between the points where the image writing and reading beams impinge the photoconductive surface may be made slightly greater than the maximum length of the image being processed. In this context it is understood that 'maximum length' is normally considered to comprise the sum of the image length plus the interdocument length.

In the exemplary arrangement shown, the dimensional relationship between the points where image write and read beams 62, 63 respectively impinge on the surface 19 of drum 18 are chosen to accommodate the required successive operation of the image writing and reading beams 62, 63. The aforedescribed non-image band 43 of transparency 42 provides the interval required to shift control mirror 78 from the image reading position (solid line) to the image writing position (dotted line). Because of the offset position of transparency 42, a relatively large interval exists on the other side of test image 40 to permit shifting of control mirror 78 in the opposite direction.

While the test image signals output by the collection optics system 100 are described herein as being used to monitor and replenish toner levels, the test image signals may instead or in addition, be used to set or adjust one or more other xerographic processing components, as for example, the bias setting of magnetic brush developing roll 25, the charge level of corotron 23 through control of corotron power supply 155, the illumination intensity of exposure lamp 15 through control of lamp power supply 159, etc.

Referring particularly to FIGS. 1 and 4, in an alternate embodiment, test image transparency 42 may be dispensed with and a test image original 42' may be disposed on platen 12 for exposure by the exposure system of xerographic section 6 with each exposure of a document original 13. To prevent erasure of the test image, aperture 39 of erase lamp 35 would be suitable configured so as to prevent or block transmission of light from lamp 36 onto the test image area.

While the invention has been described with reference to the structure disclosed, it is not confined to the details set forth, but is intended to cover such modifications or changes as may come within the scope of the following claims:

I claim:

1. In a system having a xerographic section with xerographic processing components for producing and developing images on a charged photoreceptor for transfer to copy substrate material and a scanning section with scanning components to scan images on said photoreceptor to produce signals representative of the images scanned, said scanning section including thresholding means for processing image signals produced by scanning images on said photoreceptor and a source of threshold reference signals; the combination of:
- (a) means for generating a test image for processing by said xerographic section and scanning by said scanning section;
- (b) comparator means for comparing the signals produced by scanning said test image with said threshold reference signals to provide threshold calibration signals for adjusting the threshold level of said thresholding means; and
- (c) control means for adjusting the threshold level of said thresholding means in response to said threshold calibration signals.

2. The apparatus according to claim 1 in which said xerographic section includes:
- (a) developer means for developing images produced on said photoreceptor;
- (b) a supply of developing material for said developing means;
- (c) dispensing means for dispensing developing material from said supply to said developer means; and
- (d) a source of developer reference signals;
- said comparator means comparing signals produced by scanning said test image with said developer reference signals to provide developer calibration signals for adjusting the developing level of said developer means, said control means including means for actuating said dispensing means in response to said developer calibration signals whereby to provide developing material to said developer means to adjust said developer means developing level.

3. In a system having a xerographic section with xerographic processing components for producing and developing images on a charged photoreceptor for transfer to copy substrate material and a scanning section with scanning components to scan images on said photoreceptor to produce signals representative of the images scanned, the combination of:
- (a) a high intensity beam of electro-magnetic radiation;
- (b) means to focus said beam on said photoreceptor downstream of the point where images are developed;
- (c) scanning means astride the path of said beam to scan said beam across said photoreceptor and images developed thereon
- (d) means for generating a test image for processing by said xerographic section and scanning by said beam;
- (e) image reading means for converting radiation reflected from scanning developed images including said test image on said photoreceptor to signals representative of the image scanned;
- (f) comparator means for comparing the signal produced by scanning said test image with a predetermined reference signal representing the desired operating level of at least one of said system components whereby to provide a calibration signal for adjusting said one component; and
- (g) control means for adjusting said one component in response to said calibration signal.

4. The apparatus according to claim 3 including means for actuating said test image generating means to produce a test image with each image produced.

5. The method of operating a system having a xerographic section with xerographic processing components for producing and developing copy images on a charged photoconductive member and transferring developed copy images to copy substrate material to provide copies, and a scanning section with scanning components for scanning images on said photoconductive member and producing signals representative of the image scanned, the steps comprising:
- (a) actuating said xerographic processing components to produce a test image on said photoconductive member;
- (b) actuating said scanning components to scan said test image and produce test signals representative of said test image;
- (c) comparing said test signals with predetermined reference signals to provide system calibration signals;
- (d) thresholding image signals produced by said scanning section; and
- (e) adjusting the level at which image signals are thresholded in accordance with said calibration signals.

6. The method according to claim 5 including the step of: producing said test image on said photoconductive member in the space between successive copy images.

* * * * *